United States Patent
Aihara

(10) Patent No.: US 11,710,484 B2
(45) Date of Patent: Jul. 25, 2023

(54) AGENT CONTROL DEVICE

(71) Applicant: TOYOTA JIDOSHA KABUSHIKI KAISHA, Toyota (JP)

(72) Inventor: Satoshi Aihara, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 17/225,624

(22) Filed: Apr. 8, 2021

(65) Prior Publication Data

US 2021/0358495 A1 Nov. 18, 2021

(30) Foreign Application Priority Data

May 18, 2020 (JP) .............................. JP2020-087037

(51) Int. Cl.
  *G10L 15/22* (2006.01)
  *G10L 15/08* (2006.01)
  *H04M 3/51* (2006.01)
  *H04M 3/22* (2006.01)

(52) U.S. Cl.
  CPC .............. *G10L 15/22* (2013.01); *G10L 15/08* (2013.01); *H04M 3/2218* (2013.01); *H04M 3/5116* (2013.01); *G10L 2015/223* (2013.01)

(58) Field of Classification Search
  CPC ... G10L 15/22; G10L 15/08; G10L 2015/223; G10L 2015/225; H04M 3/2218; H04M 3/5116; H04M 3/42136; H04M 2201/16; H04M 2242/04; H04W 4/44; H04W 4/90; B60W 50/08; B60W 40/08; B60W 2040/089; B60W 2540/21; H04L 67/12
  See application file for complete search history.

(56) References Cited

U.S. PATENT DOCUMENTS

| 5,655,096 A | 8/1997 | Branigin |
| 5,923,627 A | 7/1999 | Miwa et al. |
| 2010/0242041 A1 | 9/2010 | Plondke et al. |

(Continued)

FOREIGN PATENT DOCUMENTS

JP 2018-189984 A 11/2018

OTHER PUBLICATIONS

Communication dated Sep. 16, 2022 from the U.S. Patent & Trademark Office in U.S. Appl. No. 17/225,682.

(Continued)

*Primary Examiner* — Stella L. Woo
(74) *Attorney, Agent, or Firm* — Sughrue Mion, PLLC

(57) ABSTRACT

An agent control device configured to execute a plurality of agents and including a processor, the processor being configured to store an interruptibility list that stipulates interruptibility of execution for each function of one given agent being executed or for an execution status of the one given agent; request execution of each of the agents at a prescribed trigger, or request execution of another given agent at a specific trigger, reference the interruptibility list in order to set permissibility information relating to executability of the other given agent in conjunction with execution of the one given agent; and perform management such that, in a case in which there is a request at the specific trigger for execution of the other given agent while the one given agent is executing, the other given agent is executed based on the request.

1 Claim, 7 Drawing Sheets

(56) References Cited

U.S. PATENT DOCUMENTS

| | | | | |
|---|---|---|---|---|
| 2010/0332235 | A1* | 12/2010 | David | G10L 13/00 |
| | | | | 704/E15.001 |
| 2011/0016247 | A1 | 1/2011 | Ohmasa | |
| 2012/0131309 | A1 | 5/2012 | Johnson et al. | |
| 2013/0103872 | A1 | 4/2013 | Ho et al. | |
| 2014/0282003 | A1* | 9/2014 | Gruber | G06F 3/165 |
| | | | | 715/727 |
| 2015/0139441 | A1* | 5/2015 | Kawalkar | H04M 3/42 |
| | | | | 381/82 |
| 2016/0322048 | A1 | 11/2016 | Amano et al. | |
| 2017/0257345 | A1* | 9/2017 | Westra | H04W 12/08 |
| 2019/0279620 | A1* | 9/2019 | Talwar | G06F 3/167 |
| 2020/0320994 | A1* | 10/2020 | Totsuka | G06F 3/167 |
| 2021/0117479 | A1* | 4/2021 | Liu | G06N 3/082 |
| 2021/0357253 | A1 | 11/2021 | Aihara | |

OTHER PUBLICATIONS

Notice of Allowance dated Jan. 25, 2023, which issued during the prosecution of U.S. Appl. No. 17/225,682.
Corrected Notice of Allowance dated Mar. 22, 2023, which issued during the prosecution of U.S. Appl. No. 17/225,682.

* cited by examiner

FIG.3

| NON-PROPRIETARY AGENT FUNCTION | PHONE CALL | PAYMENT | WEATHER AND NEWS ACQUISITION | MUSIC |
|---|---|---|---|---|
| INTERRUPTIBILITY | NOT PERMITTED | NOT PERMITTED | PERMITTED | PERMITTED |

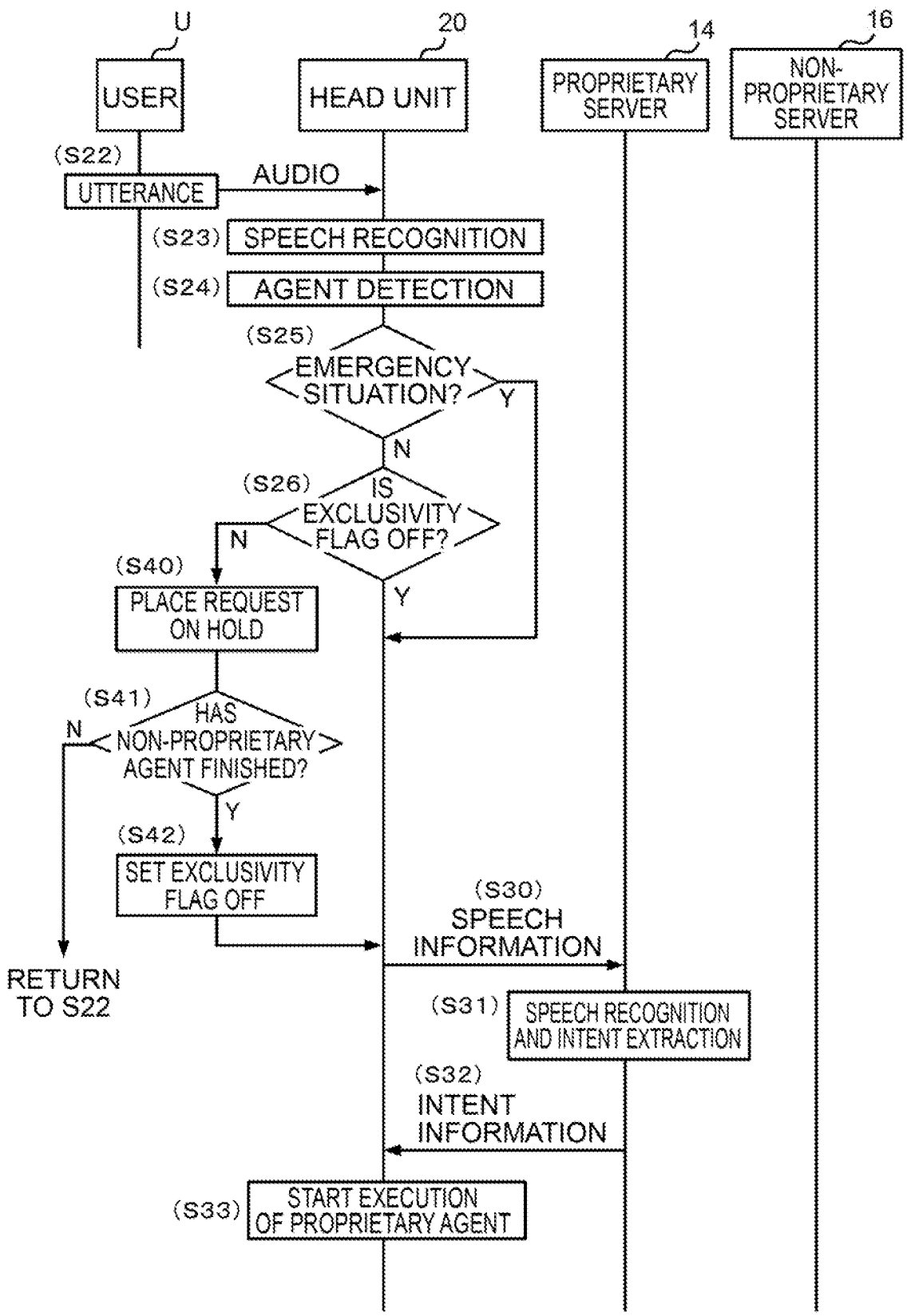

AGENT CONTROL DEVICE

CROSS-REFERENCE TO RELATED APPLICATION

This application is based on and claims priority under 35 USC 119 from Japanese Patent Application No. 2020-087037 filed on May 18, 2020, the disclosure of which is incorporated by reference herein.

BACKGROUND

Technical Field

The present disclosure relates to an agent control device to execute processing relating to an agent in response to a user request.

Related Art

Japanese Patent Application Laid-Open (JP-A) No. 2018-189984 discloses a voice interaction agent that receives an input audio signal, performs speech recognition processing on the input audio signal, and determines which agent to use to perform processing according to the input audio signal based on both the result of the speech recognition processing and agent information.

In cases in which a function that needs continuity such as a phone call is being executed by an agent, it is desirable to suppress execution of other agents. On the other hand, in cases in which another agent includes a function with greater importance than the function that needs continuity such as a phone call, such as a function supporting assistance efforts in an emergency situation, it is desirable that this important function of the other agent is executed.

SUMMARY

An object of the present disclosure is to provide an agent control device that, while a given agent is executing a function that normally needs continuity, is capable of suppressing start-up of another agent that would interrupt this function, and is also capable of prioritizing execution of an important function of another agent under a specific condition.

An agent control device of a first aspect is configured to execute plural agents. The agent control device includes a storage section configured to store an interruptibility list that stipulates interruptibility of execution for each function of one given of the agents being executed or for an execution status of the one given agent, a first request section configured to request execution of each of the agents at a prescribed trigger, a second request section configured to request execution of another given of the agent at a specific trigger, a setting section configured to reference the interruptibility list in order to set permissibility information relating to executability of the other given agent in conjunction with execution of the one given agent, and a management section. The management section is configured to perform management such that, in a case in which there is a request at the prescribed trigger from the first request section for execution of the other given agent while the one given agent is executing and the permissibility information indicates that the other given agent is not executable, execution of the given agent continues without responding to the request, and such that in a case in which there is a request at the specific trigger from the second request section for execution of the other given agent while the one given agent is executing the other given agent is executed based on the request.

The agent control device of the first aspect is capable of executing the plural agents. The storage section of the agent control device stores the interruptibility list that stipulates the interruptibility of execution either for each function of the given agent being executed or for the execution status of the given agent. In this agent control device, the given agent is requested by the first request section, and the other agent is requested by the first request section or the second request section. Examples of the "prescribed trigger" at which the first request section makes a request include an utterance from a user into a microphone, or the pressing of push-to-talk (PTT) switch. Examples of the "specific trigger" at which the second request section makes a request include an utterance of a specific phrase into the microphone by the user, or the pressing of a specific switch. The setting section references the interruptibility list in order to set the permissibility information relating to executability of the other agent as the given agent is executing.

In cases in which there is a request from the first request section for execution of the other agent while the given agent is executing and the permissibility information indicates the other agent is not executable, the management section performs management such that execution of the given agent continues without responding to the request.

This agent control device is thereby capable of suppressing start-up of the other agent that would interrupt a function that normally needs continuity during execution of this function by the given agent.

On the other hand, in cases in which there is a request for execution of the other agent from the second request section while the given agent is executing, the management section performs management such that the other agent is executed based on the request. This agent control device is thereby capable of prioritizing execution of an important function of the other agent under a specific condition.

An agent control device of a second aspect is the agent control device of the first aspect, wherein an indicator of uninterruptibility is stipulated in the interruptibility list for a function of the one given agent requiring continuity, the other given agent includes a function provided in an emergency, and the specific trigger is an utterance of a phrase suggesting an emergency.

In the agent control device of the second aspect, although a function of the given agent that needs continuity is not normally interrupted during execution of this function, when a phrase suggesting an emergency is received and the emergency function of the other agent is needed, this emergency function is executed. This agent control device is thereby capable of prioritizing execution of a function of the other agent such as supporting assistance efforts in an emergency.

An agent control device of a third aspect is the agent control device of either the first aspect or the second aspect, wherein in a case in which there is a request from the first request section for execution of the other given agent while the one given agent is executing and the permissibility information indicates that the other given agent is not executable, the management section performs management so as to place the request on hold, allow the one given agent to continue, and cause execution of the other given agent in response to the request that was placed on hold after execution has finished for the one given agent that was allowed to continue execution.

The agent control device of the third aspect does not discard the execution request for the other agent even in cases in which the other agent is not executable while the given agent is executing, and instead places the request on hold. This agent control device accordingly enables the other agent to be executed after the given agent has finished, without having to re-request the other agent.

In the present disclosure, while the given agent is executing a function that normally needs continuity, start-up of the other agent that would interrupt this function can be suppressed, and execution of an important function of the other agent can be prioritized under a specific condition.

BRIEF DESCRIPTION OF THE DRAWINGS

Exemplary embodiments of the present disclosure will be described in detail based on the following figures, wherein:

FIG. 3 is a diagram illustrating content of an interruptibility list of the first exemplary embodiment;

FIG. 7 is a sequence chart illustrating a flow of processing in an agent system of a second exemplary embodiment.

DETAILED DESCRIPTION

First Exemplary Embodiment

Figure 1:
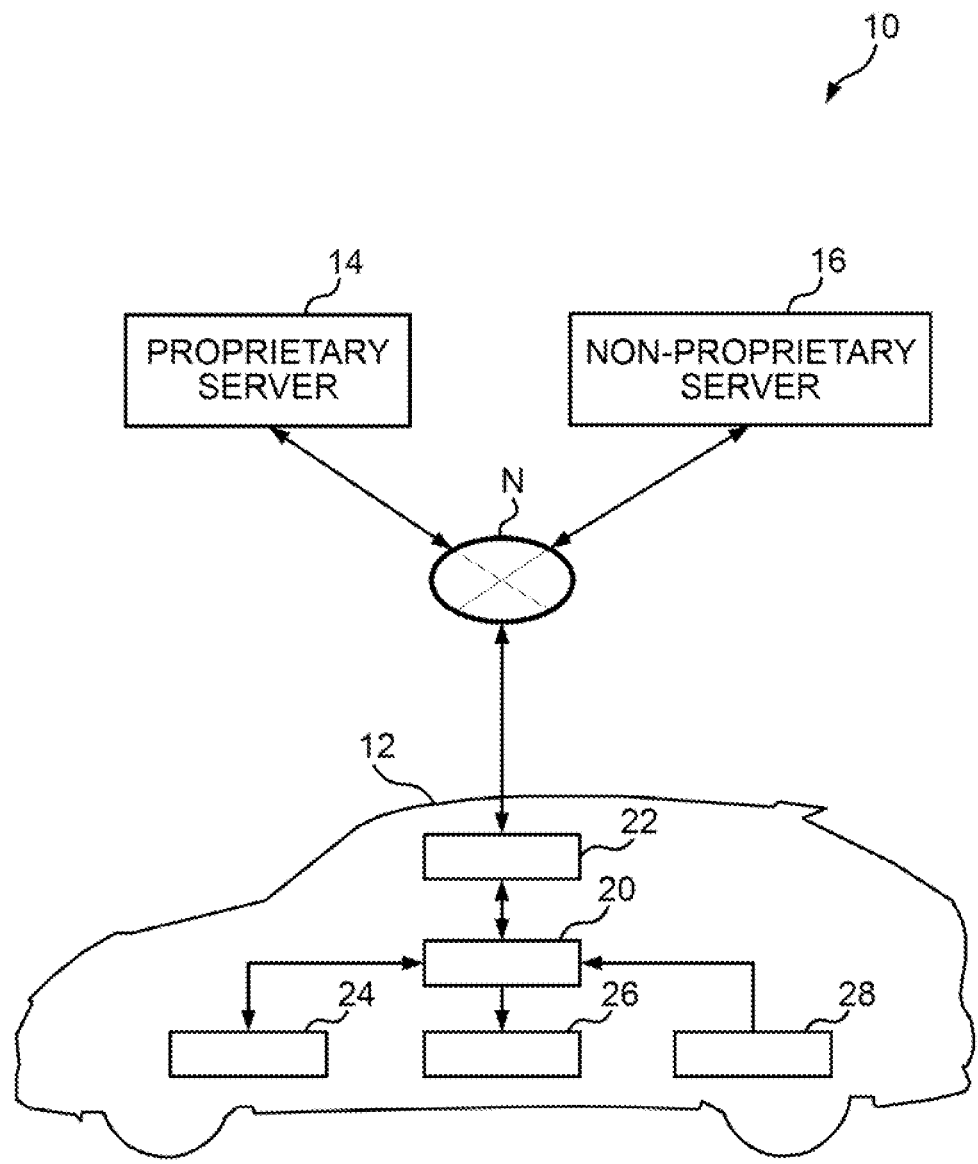
FIG. 1 is a diagram illustrating a schematic configuration of an agent system according to a first exemplary embodiment.
Figure 2:
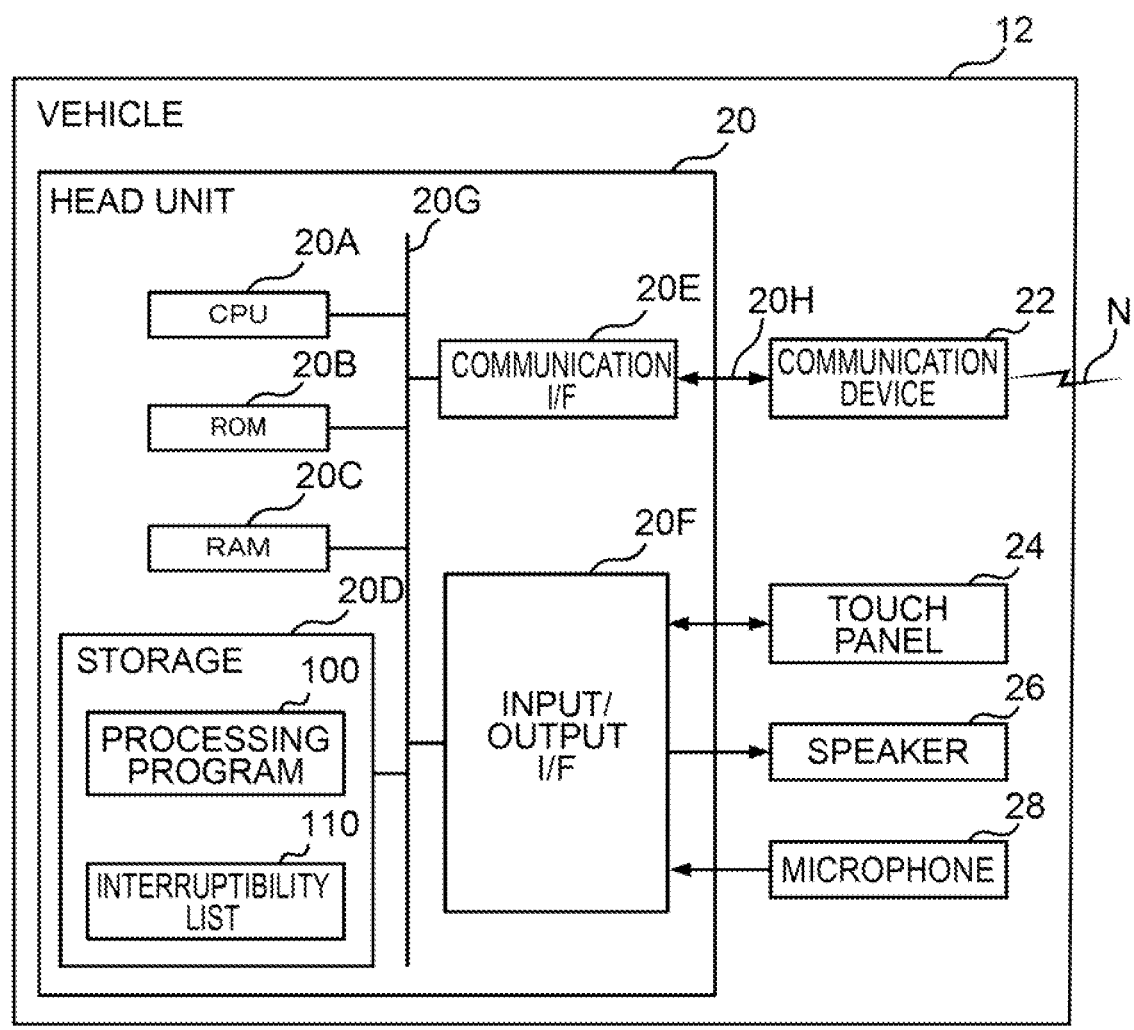
FIG. 2 is a block diagram illustrating hardware configuration of a vehicle of the first exemplary embodiment.

As illustrated in FIG. 1 and FIG. 2, an agent system 10 of a first exemplary embodiment is configured including a vehicle 12, a proprietary server 14, and a non-proprietary server 16. A head unit 20 serving as an agent control device, a communication device 22, a touch panel 24, a speaker 26, and a microphone 28 are installed in the vehicle 12. The communication device 22 of the vehicle 12, the proprietary server 14, and the non-proprietary server 16 are connected together over a network N.

The proprietary server 14 is a server belonging to the original manufacturer of the vehicle 12. The proprietary server 14 includes a function to surmise the intent of an utterance of a user U intended to cause implementation of a function of a proprietary agent, which is a service of the vehicle manufacturer. The proprietary agent includes functions relating to phone calls, weather and news acquisition, vehicle information acquisition, destination search, requests for assistance, and the like. Note that requests for assistance correspond to a function provided to the user U in an emergency, enabling for example an operator to arrange an emergency vehicle should the user U, this being the driver, become unwell or should the vehicle 12 be involved in an accident. The proprietary agent is an example of another agent.

The non-proprietary server 16 is a server belonging to an organization other than the manufacturer of the vehicle 12. The non-proprietary server 16 includes a function to surmise the intent of an utterance of the user U intended to cause implementation of a function of a non-proprietary agent, which is a service of the other organization. The non-proprietary agent includes functions relating to phone calls, payments, weather and news acquisition, music provision, audiobooks, and the like. The non-proprietary agent is an example of a given agent. Note that the proprietary agent and the non-proprietary agent may implement similar types of function to each other.

Vehicle

As illustrated in FIG. 2, the head unit 20 is configured including a central processing unit (CPU) 20A, read only memory (ROM) 20B, random access memory (RAM) 20C, storage 20D, a communication interface (b/F) 20E, and an input/output L/F 20F. The CPU 20A, the ROM 20B, the RAM 20C, the storage 20D, the communication I/F 20E, and the input/output I/F 20F are connected together so as to be capable of communicating through an internal bus 20G. The CPU 20A is an example of a processor, and the RAM 20C is an example of memory.

The CPU 20A is a central processing unit that executes various programs and controls various sections. Namely, the CPU 20A reads a program from the ROM 20B or the storage 20D, and executes the program using the RAM 20C as a workspace.

The ROM 20B stores various programs and various data. The ROM 20B of the present exemplary embodiment stores a control program to control the head unit 20.

The RAM 20C serves as a workspace to temporarily store programs and data.

The storage 20D serves as a storage section configured by a hard disk drive (HDD) or a solid state drive (SSD), and stores various programs and various data. The storage 20D of the present exemplary embodiment stores a processing program 100 and an interruptibility list 110.

The processing program 100 is a program for controlling the proprietary agent and the non-proprietary agent.

As illustrated in FIG. 3, the interruptibility list 110 is a list stipulating whether or not it is permissible to interrupt a given function of the non-proprietary agent while the function is executing. The interruptibility list 110 stipulates that functions of the non-proprietary agent that need continuity are uninterruptible while the function is executing, even when requested by the proprietary agent. For example, in cases in which the function for execution by the non-proprietary agent corresponds to a "phone call" or a "payment", interruption of this function is stipulated as being "not permitted", i.e. the function is stipulated as being uninterruptible.

As another example, in cases in which the function for execution by the non-proprietary agent is "weather and news acquisition" or "music", interruption of this function is stipulated as being "permitted", i.e. the function is interruptible.

As illustrated in FIG. 2, the communication I/F 20E is an interface for connecting to the communication device 22. This interface may, for example, employ a CAN communication protocol. The communication i/F 20E is connected to an external bus 20H.

The input/output L/F 20F is an interface for communicating with the touch panel 24, the speaker 26, and the microphone 28 installed in the vehicle 12. Note that the touch panel 24, the speaker 26, and the microphone 28 may be directly connected to the internal bus 20G.

The communication device 22 is a wireless communication module used to communicate with the proprietary server 14 and the non-proprietary server 16. The wireless communication module employs a communication protocol such as 5G LTE, or Wi-Fi (registered trademark). The communication device 22 is connected to the network N.

The touch panel 24 is provided on an instrument panel or the like, and combines a liquid crystal display serving as a display section and a touch pad serving as an input section.

The speaker 26 is provided to the instrument panel, a center console, a front pillar, a dashboard, or the like, and is a device for outputting audio relating to the proprietary agent and the non-proprietary agent.

The microphone 28 is provided to the front pillar, dashboard, or the like of the vehicle 12, and is a device that picks up speech uttered by the user U, who is an occupant of the vehicle 12.

Figure 4:
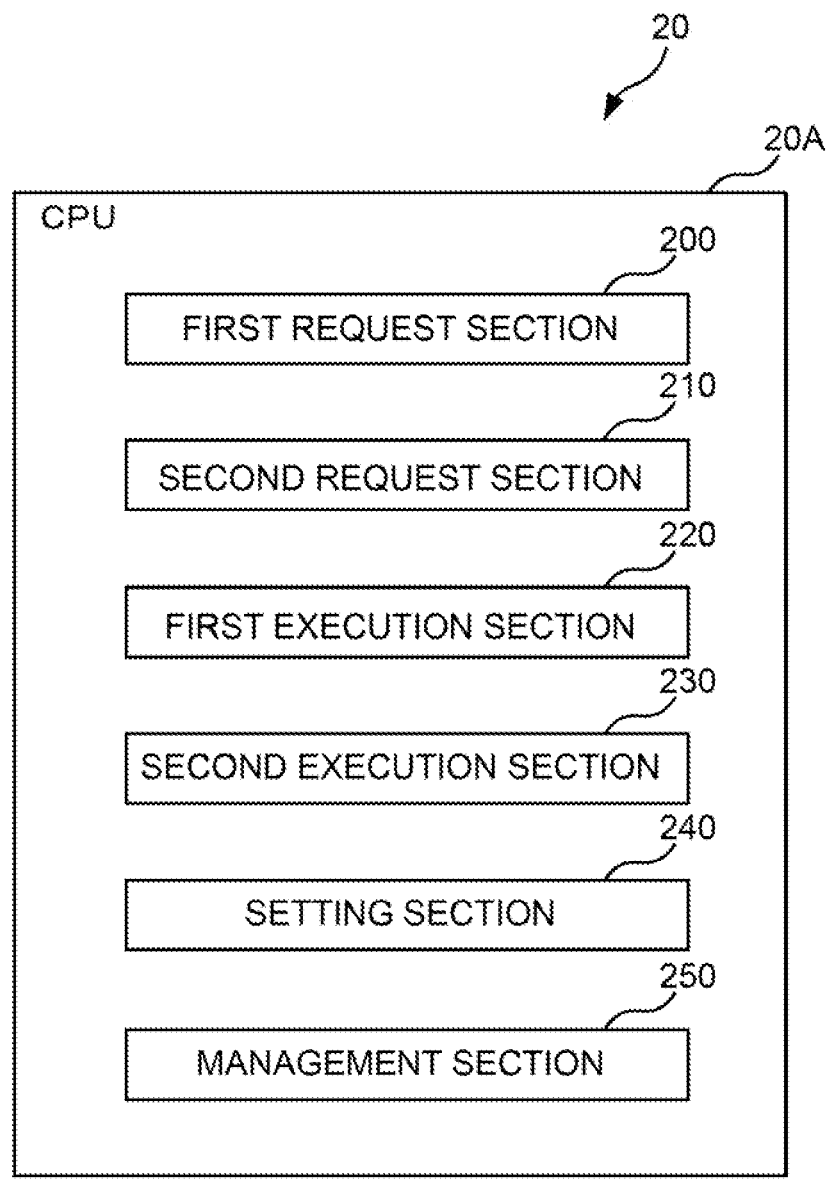
FIG. 4 is a block diagram illustrating a functional configuration of a head unit of the first exemplary embodiment.

In the head unit 20 of the present exemplary embodiment illustrated in FIG. 4, the CPU 20A executes the processing program 100 so as to function as a first request section 200, a second request section 210, a first execution section 220, a second execution section 230, a setting section 240, and a management section 250.

The first request section 200 includes a function to request execution of an agent at a prescribed trigger. Examples of the "prescribed trigger" include an utterance from the user U into the microphone 28, or the pressing of a push-to-talk (PTT) switch (not shown) provided at a steering wheel or the like. In cases in which speech information from the utterance of the user U contains a normal wake-up word for the proprietary agent, the first request section 200 transmits the speech information to the proprietary server 14 to request execution of the proprietary agent. Moreover, in cases in which the speech information from the utterance of the user U contains a wake-up word for the non-proprietary agent, the first request section 200 transmits the speech information to the non-proprietary server 16 to request execution of the non-proprietary agent.

The second request section 210 includes a function to request execution of the other agent at a specific trigger. Examples of the "specific trigger" include an utterance of a specific phrase into the microphone 28 by the user U. or the pressing of a specific switch. Examples of the specific phrase are phrases that suggest an emergency, such as expressions including "help". "emergency situation", or "request assistance". The specific switch is a dedicated assistance request switch provided separately from the PTT switch. The second request section 210 is executed in cases in which an exclusivity flag, described below, is ON.

The first execution section 220 includes a function to execute the proprietary agent. The first execution section 220 executes the proprietary agent function based on intent information provided by the proprietary server 14 to which the speech information from the utterance was transmitted.

The second execution section 230 includes a function to execute the non-proprietary agent. The second execution section 230 executes the non-proprietary agent function based on intent information provided by the non-proprietary server 16 to which the speech information from the utterance was transmitted.

The setting section 240 includes a function to reference the interruptibility list 110 in order to set permissibility information regarding the executability of the respective agents. In the present exemplary embodiment, the permissibility information is an exclusivity flag, this being a flag that can be set to ON or OFF. The setting section 240 sets the exclusivity flag based on interruptibility for each function of the non-proprietary agent, as stipulated in the interruptibility list 110. More specifically, in cases in which a function of the non-proprietary agent is uninterruptible, at the start of execution of the function by the non-proprietary agent the setting section 240 sets the exclusivity flag to ON, and at the finish of the function sets the exclusivity flag to OFF.

The management section 250 includes a function to manage execution of the respective agents. In a case in which there is a request from the first request section 200 for execution of the proprietary agent while the non-proprietary agent is executing and the exclusivity flag is ON, the management section 250 of the present exemplary embodiment causes the non-proprietary agent to continue without responding to the request to execute the proprietary agent. Moreover, in cases in which there is a request from the second request section 210 for execution of the proprietary agent while the non-proprietary agent is executing, the management section 250 executes the proprietary agent based on this request.

Control Flow

Figure 5:
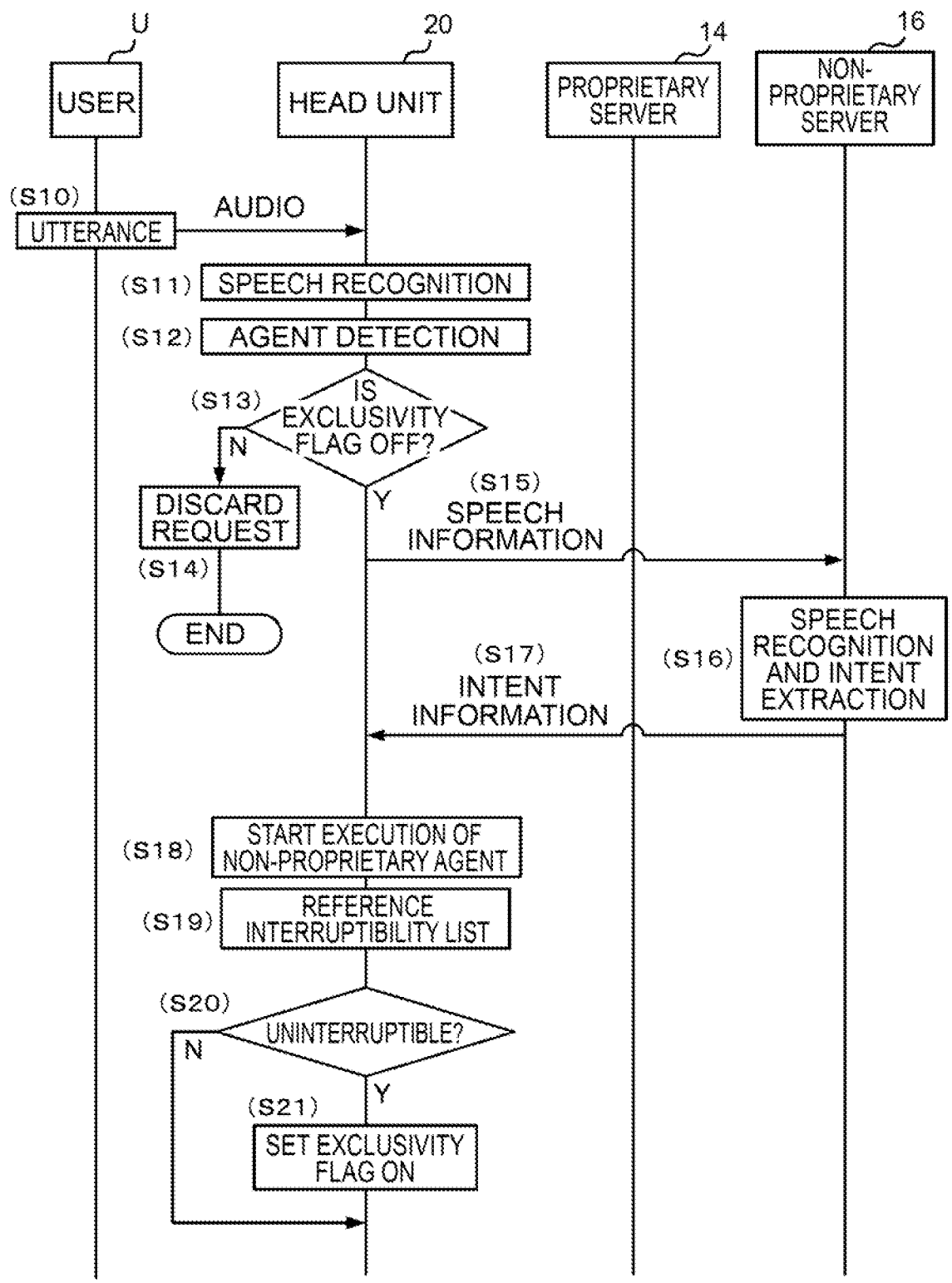
FIG. 5 is a sequence chart illustrating a flow of processing in an agent system of the first exemplary embodiment.
Figure 6:
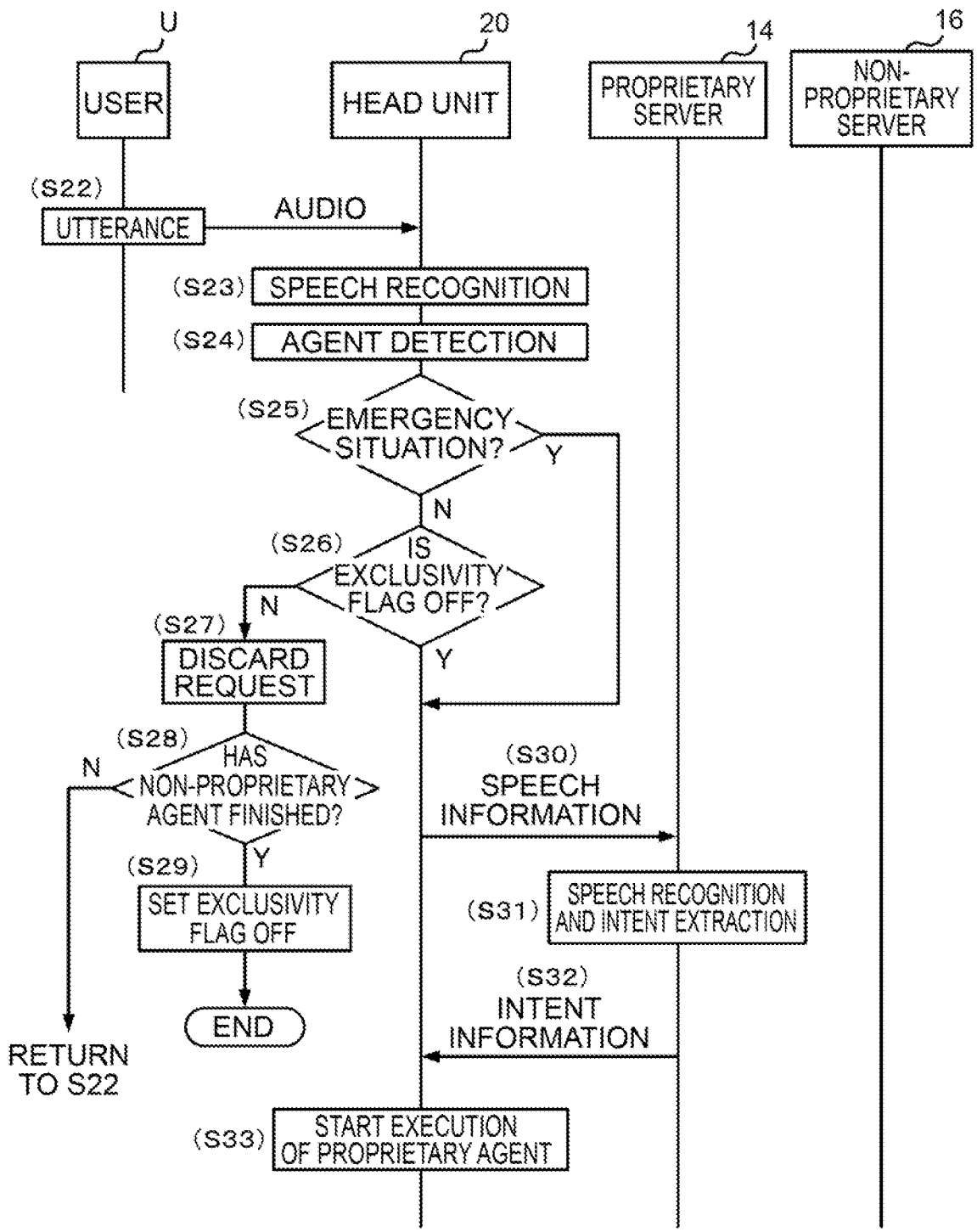
FIG. 6 is a sequence chart illustrating a flow of processing in an agent system of the first exemplary embodiment, in a continuation from FIG. 5.

Explanation follows regarding a flow of processing executed by the agent system 10 of the present exemplary embodiment, with reference to the sequence charts in FIG. 5 and FIG. 6. The processing of the head unit 20 is implemented by the CPU 20A functioning as the first request section 200, the second request section 210, the first execution section 220, the second execution section 230, the setting section 240, and the management section 250 described above.

At step S10 in FIG. 5, the user U utters something at the head unit 20. For example, user U makes a request to an agent by uttering something such as "Agent, I want to go to X" or "Assistant, call Bob".

At step S11, the head unit 20 performs speech recognition on the utterance speech of the user U.

At step S12, the head unit 20 detects whether to startup the proprietary agent or the non-proprietary agent based on speech information from the speech recognition. For example, in cases in which the wake-up word "Agent" is present in the utterance speech, the head unit 20 detects the proprietary agent as the agent to start up. On the other hand, in cases in which the wake-up word "Assistant" is present in the utterance speech, the head unit 20 detects the non-proprietary agent as the agent to start up.

At step S13, the head unit 20 determines whether or not the exclusivity flag is OFF. Processing proceeds to step S14 in cases in which the head unit 20 has determined that the exclusivity flag is not OFF, i.e. is ON. On the other hand, processing proceeds to step S15 in cases in which the head unit 20 has determined that the exclusivity flag is OFF.

At step S14, the head unit 20 discards the request to the agent. The agent execution processing is then ended.

At step S15, the head unit 20 transmits the speech information to the server of the agent detected at step S12. FIG. 5 illustrates an example in which a request is made to the non-proprietary agent. In cases in which the user U has uttered "Assistant, call Bob", speech information with the content "Call Bob" is transmitted to the non-proprietary server 16.

At step S16, the non-proprietary server 16 performs speech recognition based on the speech information that has been received, and executes intent extraction thereon. For example, the non-proprietary server 16 extracts an intent to make a phone call to Bob from the speech information "Call Bob".

At step S17, the non-proprietary server 16 transmits the extracted intent to the head unit 20 as intent information.

At step S18, the head unit 20 starts execution of the non-proprietary agent. Namely, on receipt from the non-proprietary server 16 of the intent information, which is to make a phone call to Bob, the head unit 20 starts up a phone call function, references contact details for Bob either acquired from the non-proprietary server 16 or stored in the storage 20D, and makes a phone call to Bob. A phone call is thereby started by the head unit 20.

At step S19, the head unit 20 references the interruptibility list 110. For example, as illustrated in FIG. 3, in cases in which the non-proprietary agent is performing a phone call, the information "not permitted" is acquired since the non-proprietary agent is uninterruptible.

At step S20 in FIG. 5, the head unit 20 determines whether or not the non-proprietary agent is uninterruptible. Processing proceeds to step S21 in cases in which the head unit 20 determines the non-proprietary agent to be uninterruptible. On the other hand, processing proceeds to step S22 of FIG. 6 in cases in which the head unit 20 determines the non-proprietary agent not to be uninterruptible.

At step S21, the head unit 20 sets the exclusivity flag to ON.

The processing from step S22 to step S24 of FIG. 6 is the same as the processing from step S10 to step S12 described above.

Next, in cases in which the exclusivity flag is ON, at step S25 the head unit 20 determines whether or not an emergency situation has arisen. Specifically, in cases in which a phrase suggesting an emergency is included in the results of the speech recognition of step S23, the head unit 20 determines that an emergency situation has arisen. Processing proceeds to step S26 in cases in which the head unit 20 determines that an emergency state has not arisen. On the other hand, processing proceeds to step S30 in cases in which the head unit 20 determines that an emergency situation has arisen.

The processing of step S26 and step S27 is the same as the processing of step S13 and step S14 described above.

At step S28, the head unit 20 determines whether or not the non-proprietary agent has finished. Processing returns to step S22 in cases in which the head unit 20 has determined the non-proprietary agent has not finished, namely in cases in which the non-proprietary agent is still executing. On the other hand, processing proceeds to step S29 in cases in which the head unit 20 has determined that the non-proprietary agent has finished.

At step S29, the head unit 20 sets the exclusivity flag to OFF. The agent execution processing is then ended.

In cases in which the exclusivity flag is determined to be OFF at step S26, at step S30 the head unit 20 transmits speech information to the server of the agent detected at step S24. FIG. 6 illustrates an example in which a request is made to the proprietary agent. In cases in which the user U has uttered "Agent, I want to go to X", speech information with the content "I want to go to X" is transmitted to the proprietary server 14. In cases in which the U has uttered "Request assistance" as a phrase suggesting an emergency, speech information of this utterance is sent as-is to the proprietary server 14.

At step S31, the proprietary server 14 performs speech recognition based on the received speech information, and executes intent extraction thereon. For example, the proprietary server 14 extracts an intent of searching for a destination X from the speech information of "I want to go to X". Alternatively, for example, the proprietary server 14 extracts an intent of making a phone call to an assistance request operator from the speech information of "Request assistance".

At step S32, the proprietary server 14 transmits the extracted intent to the head unit 20 as intent information.

At step S33, the head unit 20 starts execution of the proprietary agent. In the case of an emergency, the non-proprietary agent being executed is interrupted and ended, enabling a phone call to be made to the operator.

First Exemplary Embodiment: Summary

The head unit 20 of the present exemplary embodiment is capable of executing plural agents including the proprietary agent and the non-proprietary agent. The interruptibility list 110 stipulating the interruptibility of each function executed by the non-proprietary agent is stored in the storage 20D of the head unit 20. In the present exemplary embodiment, the first request section 200 requests execution of the proprietary agent or the non-proprietary agent at a prescribed trigger, such as an utterance or PTT switch operation. The second request section 210 requests execution of the proprietary agent at a specific trigger, such as utterance of a specific phrase or operation of a specific switch. When the non-proprietary agent is executed, the setting section 240 references the interruptibility list 110 in order to set the permissibility information relating to executability of the proprietary agent by setting the exclusivity flag.

In cases in which a request to execute the proprietary agent is received from the first request section 200 during execution of the non-proprietary agent while the exclusivity flag is ON, the management section 250 performs management to discard the request and continue execution of the non-proprietary agent. Namely, the present exemplary embodiment is capable of suppressing start-up of the proprietary agent that would interrupt a function that normally needs continuity during execution of this function that needs continuity, such as a phone call or payment, by the non-proprietary agent.

On the other hand, in cases in which a request to execute the proprietary agent is received from the second request section 210 during execution of the non-proprietary agent, the management section 250 performs management to execute the proprietary agent based on this request. Namely, the present exemplary embodiment is capable of prioritizing execution of the proprietary agent under a specific condition.

Moreover, in the present exemplary embodiment, in cases in which an important function to support assistance efforts is a specific condition, the second request section 210 requests an emergency function of the proprietary agent on receipt of a phrase suggesting an emergency. Accordingly, the present exemplary embodiment is capable of prioritizing execution of the proprietary agent, particularly in the case of a function to support assistance efforts or the like in an emergency.

The present exemplary embodiment also provides the exclusivity flag as permissibility information, thereby enabling centralized agent management for different functions by switching the exclusivity flag ON or OFF.

Second Exemplary Embodiment

In the first exemplary embodiment, a new agent execution request is discarded in cases in which the exclusivity flag is ON. However, in contrast thereto, a second exemplary embodiment is configured such that a new agent execution request is placed on hold in cases in which the exclusivity flag is ON. Explanation follows regarding points that differ from the first exemplary embodiment. Note that other configuration is similar to that of the first exemplary embodiment, and so detailed explanation thereof is omitted.

The management section 250 of the present exemplary embodiment places a request for execution of the proprietary agent on hold and allows the non-proprietary agent to continue in cases in which there is a request for execution of the proprietary agent from the first request section 200 while the non-proprietary agent is executing and the exclusivity flag is ON. Then, the management section 250 executes the request for the proprietary agent that has been placed on hold after execution has finished for the non-proprietary agent that was allowed to continue execution.

FIG. 7 illustrates points of difference to the first exemplary embodiment in processing executed in the agent system 10 of the present exemplary embodiment. Namely, the processing from step S40 to step S42 is executed instead of the processing from step S27 to step S29 of FIG. 6.

At step S40, the head unit 20 places the request for the agent on hold in cases in which determination at step S26 is that the exclusivity flag is not OFF.

At step S41, the head unit 20 determines whether or not the non-proprietary agent has finished. Processing returns to step S22 in cases in which the head unit 20 has determined the non-proprietary agent has not finished, namely in cases in which the non-proprietary agent is still executing. On the other hand, processing proceeds to step S42 in cases in which the head unit 20 has determined the non-proprietary agent has finished.

At step S42, the head unit 20 sets the exclusivity flag to OFF. Processing then proceeds to step S30.

Note that the request for the agent that was placed on hold at step S40 is reflected in step S30 to step S33. Accordingly, execution of the proprietary agent that has been placed on hold is started at step S33.

Second Exemplary Embodiment: Summary

The head unit 20 of the second exemplary embodiment is configured so as not to discard execution requests for the proprietary agent, even in cases in which the proprietary agent is not executable during execution of the non-proprietary agent, and to instead place such requests on hold. The present exemplary embodiment accordingly enables the proprietary agent to be executed after the non-proprietary agent has finished, without the first request section 200 re-requesting the proprietary agent.

Remarks

In the exemplary embodiments described above, determination of the interruptibility of a function is performed for each executed function of the non-proprietary agent. However, there is no limitation thereto, and determination of the interruptibility of a function that is being executed may be made in response to an execution status of the non-proprietary agent. In such cases, the interruptibility list 110 stipulates interruptibility of the non-proprietary agent based on levels that depend on the execution status of the non-proprietary agent.

For example, in cases in which the non-proprietary agent function is "shopping", stipulated levels are level A indicating processing to be uninterruptable during payment processing, level B indicating execution of the proprietary agent to be placed on hold during a purchase procedure, and a level C indicating processing to be interruptible during a product search. This enables interruption of the non-proprietary agent and execution of the proprietary agent to be controlled in response to the execution status in cases in which the non-proprietary agent is executing shopping.

Moreover, although execution of the proprietary agent is normally controlled based on executability of the non-proprietary agent as stored in the interruptibility list 110 in the exemplary embodiments described above, there is no limitation thereto. Namely, the executability of the proprietary agent may be stored in the interruptibility list 110, and execution of the non-proprietary agent may be controlled based on the executability of the proprietary agent.

The head unit 20 in the second exemplary embodiment is configured so as to be able to place a request for the proprietary agent on hold, and the request being held is transmitted to the proprietary server 14 as speech information at a stage when the non-proprietary agent has finished. However, there is no limitation thereto, and a configuration may be adopted in which in cases in which the head unit 20 has discarded a proprietary agent request, the user U may be asked to reaffirm this request when the non-proprietary agent has finished, namely, the user U may then be prompted to make an utterance.

Note that in the exemplary embodiments described above, the various processing executed by the CPU 20A reading software (a program) may be executed by various types of processor other than the CPU. Such processors include programmable logic devices (PLD) that allow circuit configuration modification post-manufacture, such as a field-programmable gate array (FPGA), and dedicated electric circuits, these being processors including a custom-designed circuit configuration for executing specific processing, such as an application specific integrated circuit (ASIC). The above-described various processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the exemplary embodiments described above, explanation has been given of cases in which respective programs are pre-stored (installed) on a computer-readable non-transitory recording medium. For example, the processing program 100 of the head unit 20 is pre-stored in the storage 20D. However, there is no limitation thereto, and the respective programs may be provided in a format recorded on a non-transitory recording medium such as a compact disc read only memory (CD-ROM), digital versatile disc read only memory (DVD-ROM), or universal serial bus (USB) memory. Alternatively, the programs may be in a form downloaded from an external device over a network.

The processing flows in the exemplary embodiments described above are merely examples thereof, and unnecessary steps may be removed, new steps may be added, or the processing sequence may be changed within a range not departing from the spirit thereof.

What is claimed is:

1. An agent control device configured to execute a plurality of agents and including a processor, the processor being configured to:
   store an interruptibility list that stipulates interruptibility of execution for each function of one given agent being executed based on an execution status of each function during execution of each function;
   request execution of each function of each of the plurality of agents based on an utterance or an action of a user;
   reference the interruptibility list in order to set permissibility information relating to the interruptibility of execution of one function of the one given agent in conjunction with execution of a function of another given agent; and perform management such that, in a case in which there is a request for execution of the function of the another given agent while the one function of the one given agent is executing, execution of the one function of the one given agent continues or the function of the another given agent is executed by override, based on the permissibility information, wherein the another given agent includes an emergency function provided in an emergency, and the processor is further configured to:

perform management such that, in a case in which there is the utterance of a phrase or the action, of the user, suggesting an emergency, while the one function of the one given agent is executing, the emergency function of the another given agent is executed by override irrespective of the permissibility information, wherein, in a case in which there is a request for execution of the another given agent while the one given agent is executing and the permissibility information indicates that the one given agent is uninterruptible, the processor performs management so as to place the request on hold, allow the one given agent to continue, and cause execution of the another given agent in response to the request that was placed on hold after execution has finished for the one given agent that was allowed to continue execution, and wherein, in a case in which the request is placed on hold and the one given agent has been allowed to continue, the processor seeks reaffirmation of the utterance or the action of the user based on completion of execution of the one given agent that was allowed to continue execution.

* * * * *